United States Patent [19]

Freeman

[11] 3,895,571
[45] July 22, 1975

[54] BALER STRUCTURE WITH NEEDLE ACTUATED RELEASE MECHANISM FOR TENSION CONTROL

[76] Inventor: Percy F. Freeman, 4061 S.W. Greenleaf Dr., Portland, Oreg. 97221

[22] Filed: June 27, 1974

[21] Appl. No.: 483,719

[52] U.S. Cl.................. 100/4; 100/19 R; 100/43
[51] Int. Cl........................................... B65b 13/22
[58] Field of Search.............. 100/4, 19 R, 43, 192

[56] References Cited
UNITED STATES PATENTS

| | | | |
|---|---|---|---|
| 2,396,720 | 3/1946 | Nolt | 100/19 |
| 2,890,646 | 6/1959 | Soteropulos | 100/43 |
| 3,350,999 | 11/1967 | Morse | 100/43 |
| 3,851,575 | 12/1974 | Cardoza | 100/4 |

*Primary Examiner*—Billy J. Wilhite
*Attorney, Agent, or Firm*—Eugene M. Eckelman

[57] ABSTRACT

Structure is associated with the twine feeding needle mechanism of a baler and hydraulically operated tension means in an arrangement such that at the time the needle in an upper position thereof feeds the twine to a knotter, the tension means is released so that excess twine can be obtained from between adjacent bales for tying the knot. The release is accomplished by a linkage secured to the needle mechanism or by a valve disposed in the path of and engageable by the needle mechanism.

6 Claims, 5 Drawing Figures

BALER STRUCTURE WITH NEEDLE ACTUATED RELEASE MECHANISM FOR TENSION CONTROL

BACKGROUND OF THE INVENTION

This invention relates to a new and novel needle actuated release mechanism for baler tension controls.

Baler tension controls have heretofore been provided for the purpose of making bales with substantially equal density. For this purpose, the baling chamber has movable defining walls, and the positioning of these walls is selected by the tension control mechanism. It is desired that the bale be tight in order to conserve on storage space, to make them easier to handle, and to save on the binding material. In many cases, the binding material comprises twine, and while the twine is sufficiently strong to hold the bale, it is frequently broken by the knotter mechanism since the tight control of the bale does not permit sufficient slack in the twine for formation of the knot.

SUMMARY OF THE INVENTION

According to the present invention and forming a primary objective thereof, means are provided in combination with the tension control of a baler which is arranged to automatically release the tension control at the time that the knot is being formed in the twine so that a sufficient amount of twine for forming the knot can be drawn in from around the bale and prevent breakage of the twine.

A more particular object of the present invention is to provide in one embodiment linkage means connected between the twine feeding needle of the baler and the tension control, such linkage means being arranged such that as the needle feeds the twine to the knotter mechanism, the tension control is released and sufficient slack is made available in the twine for forming the knot.

Another object is to provide an embodiment utilizing valve means arranged to be engaged by the twine feeding needle and disposed in the hydraulic circuit of the tension control, the valve means being arranged to release the tension control at a selected time when the knot is to be formed by the knotter.

The invention will be better understood and additional objects and advantages will become apparent from the following description taken in connection with the accompanying drawings.

BRIEF DESCRIPTION OF THE DRAWINGS

FIG. 5 is also a diagrammatic view but showing a modified form of the present release mechanism.

DETAILED DESCRIPTION OF PREFERRED EMBODIMENTS

Figure 1:
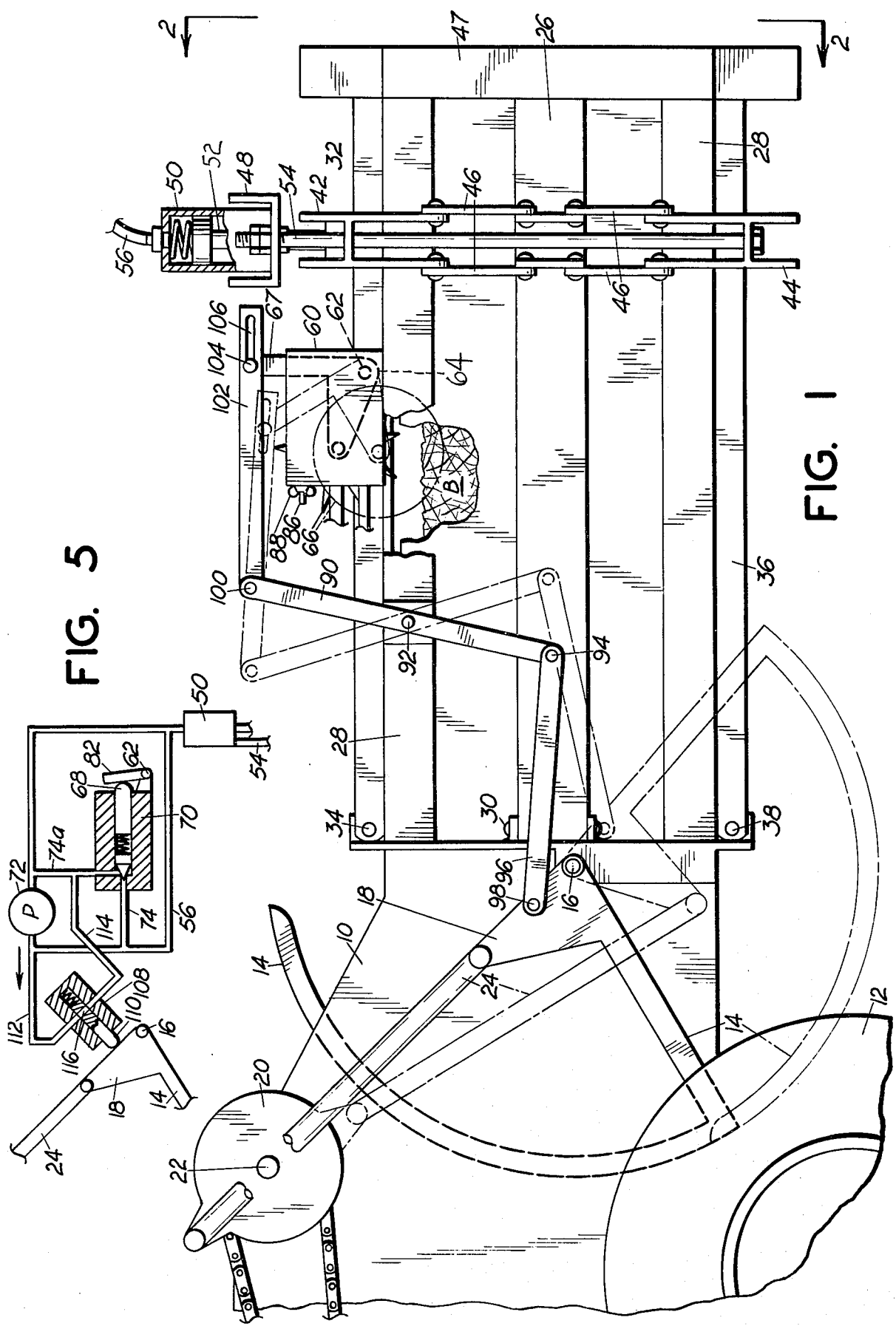
FIG. 1 is a fragmentary side elevational view of a baler mechanism and showing a first form of release mechanism of the present invention, a portion of this view being broken away.
Figure 2:
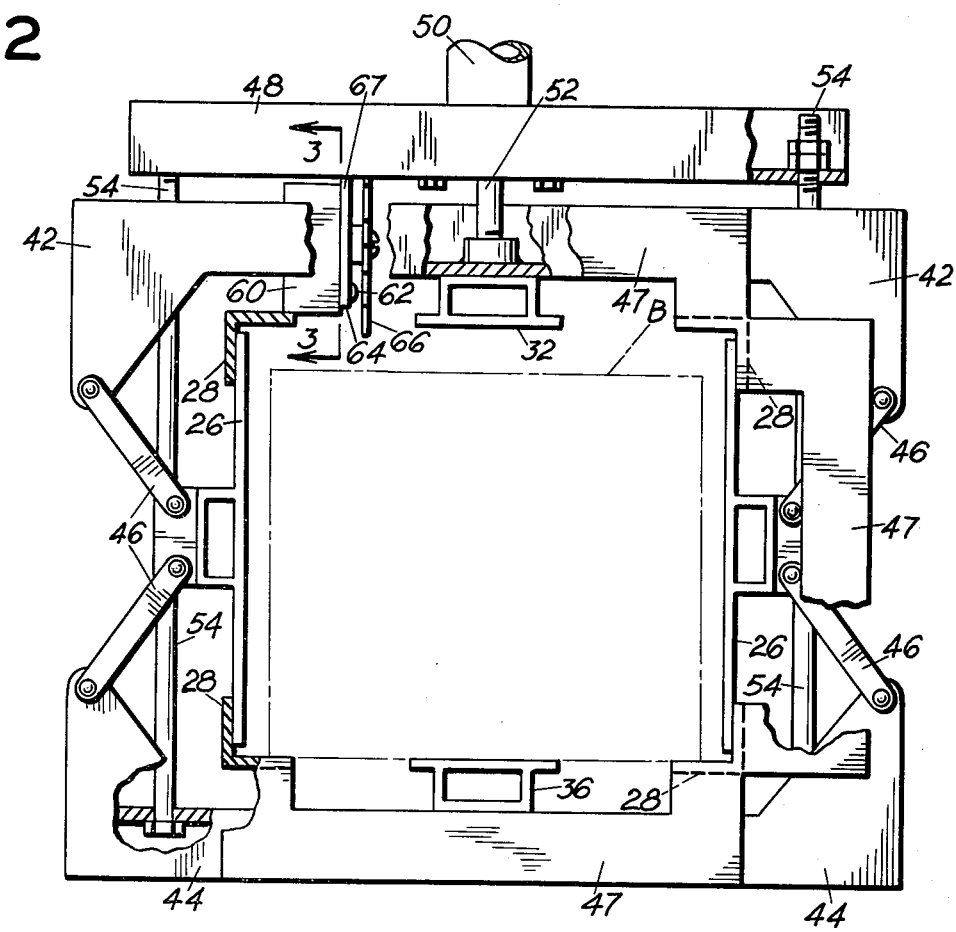
FIG. 2 is an end elevational view of the baling chamber, this view being taken on the line 2—2 of FIG. 1 and also having portions thereof broken away.

With particular reference to the drawings and first to FIGS. 1 and 2, a baler mechanism of conventional construction comprises a supporting frame 10 usually mounted on wheels 12 and having a needle 14 pivotally supported at 16 on the frame. The needle 14 comprises an integral part of a lever arm 18 to which the pivot connection 16 is made, and this lever arm and the needle are swingable from a lower rest position shown in broken lines in FIG. 1 to an upper position shown in full lines for feeding twine T to a knotter K, FIG. 4. Rotation of the needle is accomplished by a disc 20 secured on a powered shaft 22 of the baler and connected to the lever arm 18 by a link bar 24. Shaft 22 also drives the knotter mechanism of conventional construction. The knotter operates in synchronized movement with the needle 14 for receiving twine from the needle. A plunger also operates in synchronized movement with the needle for moving material B into the bale chamber and compacting it.

The baling chamber is composed of side plates 26 confined within longitudinal angle iron frame members 28. These plates are pivotally connected by vertical axis pivot means 30 to the baler frame. A top longitudinal wall member 32 is pivotally connected to the baler frame by horizontal axis pivot means 34 and a bottom longitudinal wall member 36 is pivotally connected to the baler frame by horizontal axis pivot means 38. By the pivot connection of the defining walls of the bale chamber as described, it is apparent that the chamber is adapted to be enlarged or diminished at its outer or discharge end, namely, to the right in FIG. 1.

Apparatus used for controlling the tension of a bale in the bale chamber is also in conventional use and comprises top and bottom channel members 42 and 44, respectively, FIGS. 1 and 2 pivotally interconnected to the side plates 26 by pairs of links 46. The links 46 extend inwardly at an angle from the top and bottom channel members, and it is apparent that as the members 42 and 44 move toward each other the side plates 26 similarly move toward each other. Conversely, as the members 42 and 44 move away from each other, the side plates 26 move away from each other. Top and bottom members 42 and 44 are secured to the top and bottom longitudinal wall members 32 and 36 respectively, and an end wall 47 having a center opening 47a for discharge of the baled material therethrough is secured to frame members 28.

A channel-shaped header bar 48 is disposed above the member 42 and has integral connection with the lower end of a fluid operated cylinder 50. The piston rod 52 of cylinder 50 slidably extends down through the header bar 48 and has integral connection with member 42. Bar 48 also has integral connection with the bottom member 44 by means of upright tie rods 54 extending slidably through member 42. A fluid supply line 56 for the cylinder 50 is at the top of the cylinder, and it is apparent that as pressure is applied to the cylinder 50 for extending its piston rod 52, the members 42 and 44 and side plates 26 are urged together.

Operation of the cylinder 50 is controlled by bale density sensing apparatus comprising a housing 60 secured on one of the frame members 28 and having a lateral shaft 62 journaled therein. This shaft projects through the housing at the baling chamber side, and secured on the projecting end for rotation therewith is an arm 64. A star wheel 66 is rotatably mounted on the free end of the arm 64 and rides on the material in the baling chamber with the vertical position thereof being determined by the density of said material. Arm 64 has an upright extension 67 projecting above housing 60.

Figure 3:
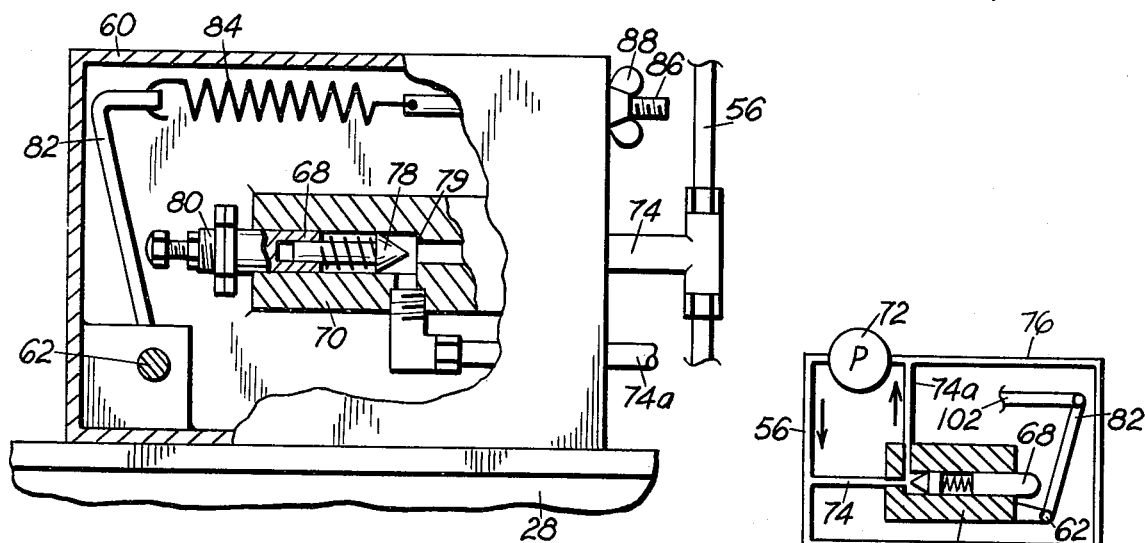
FIG. 3 is an enlarged fragmentary elevational view taken on the line 3—3 of FIG. 2 and having a portion thereof broken away.
Figure 4:
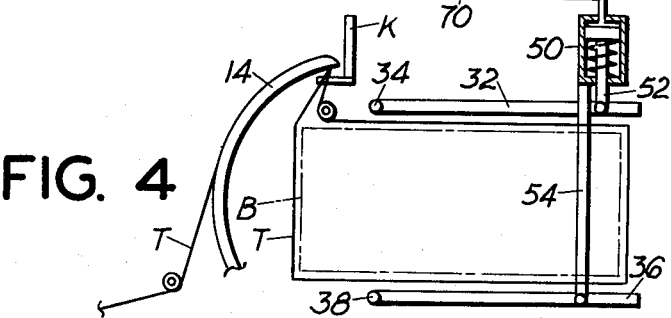
FIG. 4 is a diagrammatic view of baler portions and tension control means therefor, and also showing release mechanism of the present invention in combination therewith.

With particular reference to FIGs. 3 and 4, housing 60 has a needle valve 68 operating horizontally in a valve body 70. Fluid line 56 from the cylinder 50 is in a pressure supply system including a pump, and the valve 68 controls the flow of fluid in bypass lines 74 and 74a leading from the valve body 70 to a line 56 and to a line 76, respectively, comprising a return line from cylinder 50 to the pump. Needle valve 68 has a spring loaded tip arranged to engage a seat 79 in the valve body, and such valve also has adjustment and abutment means 80 at the opposite end from the tip. When the valve is seated, pressure of the pump 72 will be applied to cylinder 50 to operate the tension means, and when the valve is unseated, the tension means is released. Intermediate positions of the valve provide varying pressure applying forces to the tension means.

An upright arm 82 is secured on the shaft 62 within the valve housing 60 and is arranged to engage the abutment end of needle valve 68. This arm is connected at its free end to one end of a tension spring 84. The other end of this tension spring is connected to a rod 86 having length adjustment relative to the housing by a wing nut 88 threadedly engaged with a projecting end of the rod. Adjustment of the tension of spring 84 will vary the downward force applied to the star wheel 66 and thus the compactness of the bales.

The tension means described above is also in convention practice and thus detailed operation and adjustment thereof will not be set forth herein. In brief, however, the star wheel 66 controls the density of the bale by its vertical position. That is, as long as the bale is being compacted at the desired density, the star wheel is raised by such material to retract arm 82 and allow fluid to bypass the cylinder 50. As the density of the bale drops, however, the star wheel will move down and cause the tip 78 of the valve to restrict fluid flow through the valve. Fluid from the pump cannot thus circulate through the conduits 74 and 74a and will be directed under pressure into the cylinder 50. Operation of such cylinder will as described hereinbefore close in the top and bottom members 42 and 44 and side plates 26 to compact the material within the baling chamber. As the bales in the baling chamber compact, the star wheel 66 will be raised by the material and thus allow the needle valve 68 to back off and allow bypass circulation through conduits 74 and release of members 42 and 44 and the side plates 26. Thus, according to the vertical position of the star wheel 66, as determined by the tension of the bale, the selected pressure operation of the fluid cylinder 50 is accomplished to maintain selected density of the bales.

In the embodiment of FIG. 1, the automatic tension release comprises an upstanding lever 90 pivotally connected intermediate its ends 92 to a frame member 28. The lower end of lever 90 has a pivot connection 94 with one end of a link 96 the other end of which has pivot connection 98 with the lever arm 18 of needle 14 at a point offset from pivot point 16 for the needle. The other end of lever 90 has a pivot connection 100 with one end of a second link 102 connected at its other end to the upper end of upright extension 67 of the arm 64.

The connection between the link 102 and the extension 67 is accomplished through the medium of a pin 104 on the extension 67 engageable in a closed end slot 108 in the link 102.

The throw of the lever 90 through the selected positioning of its pivot connection 98 with the needle 14 and the selected length of slot 108 is such that as the needle reaches its upper position where twine is being fed to the knotter, the lever 90 is rotated clockwise, FIG. 1, an amount such that arm 64 retracts the arm 82 in the valve housing 60 so that needle valve 68 will withdraw and fluid can bypass through lines 74 and 74a. This relieves the cylinder 50 from pressure, and the members 42, 44 and side plates 26 move outwardly so that twine under this loosened condition of the bale can be drawn in by the knotter. The extra twine to tie the knot must come from around the bale, and the release of tension laterally around the bale will allow the twine to slide at the ends of adjacent bales. The knots are thus formed with very little possibility that the twine will be broken.

FIG. 5 shows a second embodiment of the invention employing a valve mechanism 108 arranged to be selectively mounted on the baler frame such that it is in the path of and engaged by the lever arm 18 of the needle mechanism 14 when the latter is in its up or twine feeding position. Such illustrates that the needle actuated mechanism of the present automatic tension release does not have to be attached to the needle mechanism.

Housing 108 has a spring pressed plunger 110 projecting therefrom and arranged to be engaged by the needle mechanism and moved inward in the up position of the latter. A fluid line 112 leads from line 56 into one side of the valve housing 108 and a fluid line 114, connected into the line 74a, leads into the housing 108 on the side opposite of line 112, the lines 112 and 114 opening into the cylinder portion for the plunger 110. Plunger 110 has a diametral bore 116 positioned such that when the needle mechanism is in the up position and the plunger 110 is moved inwardly, bore 116 is aligned with the conduit connections of lines 112 and 114 so that fluid from the pump can freely pass therethrough. This provides a bypass of the pressure system for the cylinder 50 and will thus allow the tensioning mechanism to release so that excess twine can be drawn in by the knotter mechanism for tying the knot. As the needle moves down, the plunger is returned under the force of its spring and the bypass through lines 112 and 114 is cut off so that the cylinder 50 again placed in operation.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A baler structure comprising
   a. a support frame,
   b. wall means on said frame defining a baling chamber for forming bales in end to end relation,
   c. said wall means being movable between an outer tension relief position of bales in the bale chamber and an inner bale compressing position, d. a twine feeding needle mechanism on said frame being movable between a lower inoperative position and an upper twine feeding position, e. a knotter mechanism on said frame arranged to receive twine from said needle mechanism in the upper position of the latter, f. pressure operated means engageable with said wall means for moving said wall means to said bale compressing position, g. and relief means operated by said needle mechanism arranged in the upper feeding position of the latter to relieve said pressure operated means whereby said wall means can move outwardly at such time through their tension relief position so that twine around the bale can move between bales to make an excess amount available to the knotter for forming a knot.

2. The baler structure of claim 1 wherein said pressure operated means includes a fluid operated cylinder and pressure system therefor and said relief means includes a by-pass in said pressure system.

3. The baler structure of claim 2 wherein said relief means comprises a valve controlling operation of said by-pass, and means on said twine feeding needle arranged to operate said valve and by-pass at the upper twine feeding position of the needle mechanism.

4. The baler structure of claim 2 wherein said relief means comprises a valve controlling operation of said by-pass, and linkage means connected between said needle mechanism and said valve arranged to operate said valve and by-pass at the upper twine feeding position of the needle mechanism.

5. The baler structure of claim 2 wherein said relief means comprises a valve controlling operation of said by-pass, an upstanding lever pivotally mounted on said frame, a first link pivotally connected at one of its ends to one end of said lever and pivotally connected at its other end to said needle mechanism, and a second link pivotally connected at one of its ends to the other end of said lever and pivotally connected at its other end to said valve, said lever and links being arranged to operate said valve and by-pass at the upper twine feeding position of the needle mechanism.

6. The baler structure of claim 2 wherein said relief means comprises a valve controlling operation of said by-pass, said valve having a housing and operable plunger therein controlling operation of said by-pass, a portion of said plunger projecting from said housing, said valve being supported on said frame selectively such that said needle mechanism engages said valve plunger at its upper twine feeding position and moves said plunger to operate said by-pass.

* * * * *